United States Patent [19]

Moen et al.

[11] 4,334,961
[45] Jun. 15, 1982

[54] PAIRED STAGE FLASH EVAPORATOR HAVING IMPROVED CONFIGURATION

[75] Inventors: David L. Moen, Glen Mills; Ray D. Peterson, Upper Providence Township, Delaware County, both of Pa.

[73] Assignee: Westinghouse Electric Corp., Pittsburgh, Pa.

[21] Appl. No.: 288,954

[22] PCT Filed: Jun. 19, 1981

[86] PCT No.: PCT/US81/00851

§ 371 Date: Jun. 19, 1981

§ 102(e) Date: Jun. 19, 1981

[51] Int. Cl.³ .................. B01D 3/06; C02F 1/06
[52] U.S. Cl. .................. 202/173; 202/180; 202/182; 202/197; 202/202; 159/2 MS; 203/11; 203/88
[58] Field of Search ............ 202/173, 172, 174, 177, 202/180, 182, 197, 202, 201, 205, 155; 203/10, 11, 22, 73, 88, 91; 208/349, 352, 361, 365; 159/2 MS; 122/441, 442

[56] References Cited

U.S. PATENT DOCUMENTS

| | | |
|---|---|---|
| 3,197,387 | 7/1965 | Lawrence .................. 202/173 |
| 3,228,859 | 1/1966 | Frankel et al. .................. 202/173 |
| 3,326,280 | 6/1967 | Bosquain et al. .................. 202/173 |
| 3,457,142 | 7/1969 | Starmer .................. 202/173 |
| 3,488,260 | 1/1970 | Gilbert .................. 202/173 |
| 3,707,442 | 12/1972 | Takahashi et al. .................. 202/173 |
| 3,713,989 | 1/1973 | Bom .................. 202/173 |
| 3,933,597 | 1/1976 | Barba et al. .................. 202/173 |
| 4,167,437 | 9/1979 | Gilbert .................. 202/174 |

FOREIGN PATENT DOCUMENTS

| | | | |
|---|---|---|---|
| 12256 | 6/1980 | European Pat. Off. ............ 202/173 |
| 14672 | 8/1980 | European Pat. Off. ............ 202/173 |
| 54-116381 | 9/1979 | Japan .................. 202/173 |

*Primary Examiner*—Wilbur L. Bascomb, Jr.
*Attorney, Agent, or Firm*—E. F. Possessky

[57] ABSTRACT

A paired stage flash evaporator unit is provided with an elongated shell having respective higher temperature and lower temperature evaporation chambers extending along a bottom portion of the shell space and separated from each other by an interstage elongated partition wall. A condenser tube bundle extends longitudinally between opposite shell end walls in an upper portion of the shell space. A transverse interstage partition separates the tube bundle into separate condenser chambers. Each condenser chamber is paired with an evaporation chamber by means of shroud and other isolation structure thereby forming two paired stages in the unit.

In each stage, a liquid separator mesh extends coextensively with the evaporation chamber and both condenser chambers to direct vapor from the evaporation chamber into a flow path above the mesh. Vapor which is generated at points longitudinally displaced from the associated condenser chamber can thus flow longitudinally along the flow path above the mesh to an area where it is directed into the associated condenser chamber. The shell has a roof member which is sloped over the space above each mesh so that the longitudinal flow path increases in cross section toward the receiving condenser chamber.

19 Claims, 8 Drawing Figures

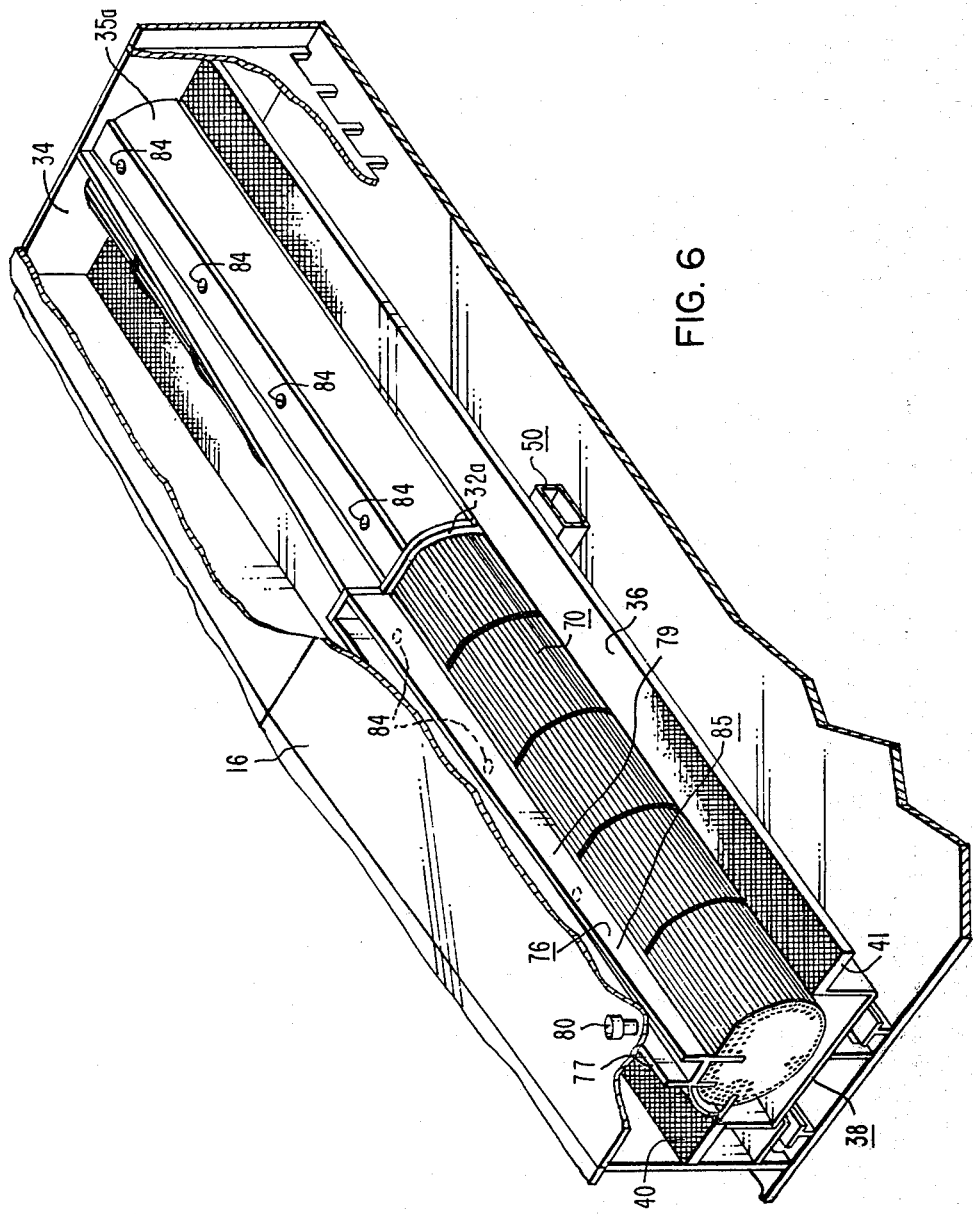

PAIRED STAGE FLASH EVAPORATOR HAVING IMPROVED CONFIGURATION

CROSS REFERENCE TO RELATED APPLICATIONS

Reference is made to Ser. No. 165,885, entitled "Multi-Stage Flash Evaporator Design" and filed on July 3, 1980 as a continuation of an application filed earlier on Dec. 8, 1978 by R. E. Bailie and assigned to the present assignee.

BACKGROUND OF THE INVENTION

The present invention relates to water desalting plants and more particularly to paired stage flash evaporators used in such plants.

In multistage flash evaporator water desalting plants, brine flows through successive evaporation stages at successively lower pressures. In each evaporation stage, water flashes to vapor which rises to an associated condenser stage where water condenses on condenser tubes and falls to a collection tray. The term "unit" as used herein is meant to refer to that portion of each multistage evaporator vessel which is associated with a single tube bundle.

In the common long flow design for multistage flash evaporator units, the brine flows from evaporation stage to evaporation stage parallel to the direction of condenser tubes which extend between the ends of the evaporator unit. A plurality of stages, for example six to eight, may be included in each unit with a common partition separating the evaporation chamber and condenser chamber of each stage from the evaporation chamber and condenser chamber of the next stage. A pair of end tube plates and a pair of water boxes are needed for each long flow unit.

While the long flow design provides economy in the total number of end tube plates and water boxes needed for a plant, it has maintenance cost disadvantages particularly those resulting from the use of lengthy condenser tubes which may span 6 to 8 stages in a single unit. The long flow design characteristics usually make it most economical from manufacturing and operating standpoints for smaller capacity plants (say up to 3 million gallons per day) and for the very high capacity plants (say 10 million gallons per day and above).

The cross-flow design is another common design for multistage flash evaporator units. In the cross-flow arrangement, each stage is provided with a pair of water boxes and a pair of end tube plates. The condenser tubes extend between the end tube plates and are associated with a single evaporation chamber in which brine flows in the direction transverse to the condenser tubes. In this arrangement, there is no internal partitioning between successive stages in each evaporation unit because each unit typically contains a single stage. Partitioning between stages is thus provided by the separation of stages between successive units.

While the cross-flow design facilitates plant operation and provides some operating economy with the use of relatively short condenser tubes in each unit, more units are required. Since each unit requires two end tube plates and two water boxes, manufacturing costs are significantly increased. The prior art cross-flow design is usually more economical in higher capacity plants (say 2½ to 6 million gallons per day).

A more recent improved type of evaporator unit is referred to as a paired stage cross flow unit and it is disclosed in the cross-referenced patent application. In the paired stage cross-flow unit, a pair of evaporation stages and a pair of condenser stages are included in a single cross-flow unit with separation between the two evaporation chambers in the two successive evaporation stages provided by one partition which extends parallel to the tube axis and separation between the two condenser chambers provided by another partition which extends perpendicular to the tube axis direction. Flow communication is provided between the commonly staged evaporation and condenser chambers to provide for vapor flow for condensation and distillate collection. Likeness to the long flow design exists because the condenser tubes pass through two condenser chambers within a single evaporator unit. Cross-flow likeness exists because the brine flows transversely rather than longitudinally of the condenser tubes.

Because of the improved structure of the paired stage evaporator, two stages of flashing and condensing are provided in a single installed evaporator unit, where only one was possible in previous cross-flow designs. As a result, paired stage evaporator vessels provide generally improved operating efficiency, are shorter and lighter, and can be the same width as, or slightly wider than, evaporator vessels of conventional cross-flow design, for a given number of stages.

The paired stage evaporator plant, which comprises a group of adjacent evaporator units having their tube bundles connected by crossover piping, is typically smaller in plan area by 20 to 25 percent. A desalination plant of high capacity and conventional design might include 24 evaporator units connected in series with crossover piping to form an evaporator with 24 stages. In the paired stage configuration, only 12 evaporator units are needed to provide 24 stages of evaporation; the twelve paired-stage units are capable of producing the same quantity of distillate as 24 conventional cross-flow units.

As a result of the paired stage configuration, reduced tube plate and water box requirements lead to higher plant availability and lower maintenance cost and lower pumping energy costs. Single train plants can be constructed with lower initial cost and with greater total brine processing capacity.

In the various types of evaporator units described, a mesh is usually disposed in the vapor flow path between each evaporation stage and its associated condenser stage to separate liquid from carryover to the condenser tube bundle. When entrained droplets are collected and become heavy enough in the mesh, they fall back into the brine below in the evaporation chamber.

In the conventional long flow and cross-flow units, the evaporation and condenser chambers in each stage are substantially coextensive with a coextensive mesh disposed therebetween.

In the paired stage unit described in the cross-referenced patent application, the evaporation chamber of each of the two stages extends across the two condenser chambers. The mesh in each stage is coextensive with the condenser chamber into which vapor is directed from the underlying evaporation chamber. The mesh width (in the brine flow direction) is sufficient to provide the mesh area needed to accommodate the vapor flow to the condenser stage. The minimum width of the paired stage evaporator unit is thus directly affected by the minimum width of the mesh which is coextensive with the condenser stage. The efficiency of paired stage plant operation and the minimum paired stage evaporation unit size, weight and cost, relative to conventional long and cross-flow designs, are accordingly limited by the prior art paired stage mesh arrangement. It is thus desirable to provide an improved paired stage evaporator unit which functions better with more user efficiency through an improved mesh arrangement.

SUMMARY OF THE INVENTION

A paired stage flash evaporator unit includes an elongated shell having a pair of elongated evaporation chambers extending along a bottom portion thereof and separated by a longitudinal interstage partition. The shell further includes a pair of condenser chambers located in an upper portion thereof and separated from each other by a transverse interstage partition.

Means including a liquid separator means are provided for directing vapor from one evaporation chamber to one of the condenser chambers in one stage and from the other evaporation chamber to the other condenser chamber in the other stage. The liquid separator means are substantially coextensive with the evaporation chambers and both condenser chambers.

Space above each liquid separator means provides a flow path for the vapor to enter the associated condenser chamber. Preferably, boundary structure means are provided about the flow path so that the path cross section increases with decreasing longitudinal spacing from the receiving condenser chamber.

BRIEF DESCRIPTION OF THE DRAWINGS

FIG. 6 shows a perspective view of the FIG. 7 embodiment with portions thereof broken away.

DESCRIPTION OF THE PREFERRED EMBODIMENT

Figure 1:
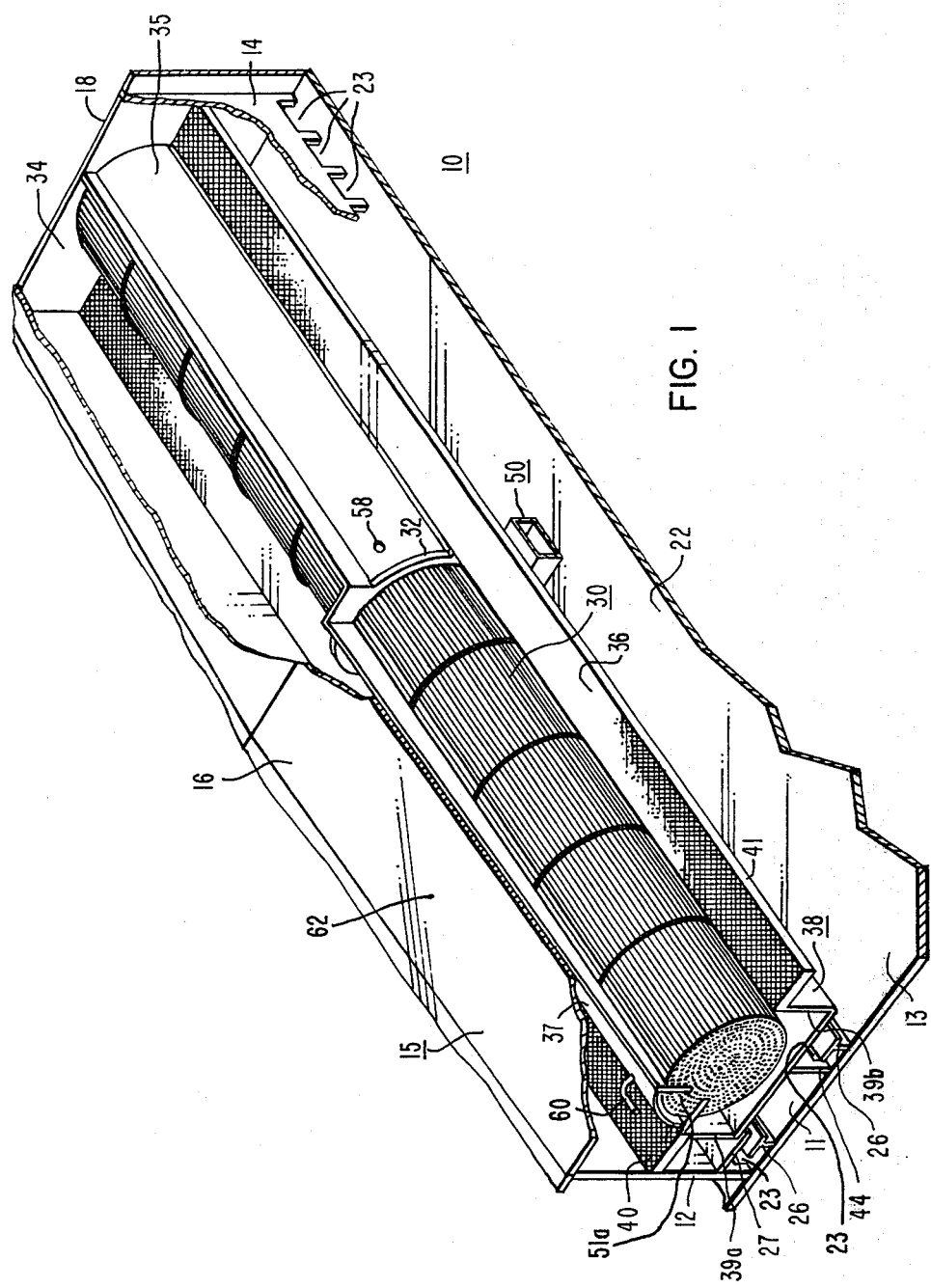
FIGS. 1 and 2 show different isometric views of an elongated flash evaporator unit arranged in accordance with the principles of the invention.

More particularly, there is shown in FIGS. 1-5, a paired stage evaporator unit 10 of a multi-stage flash evaporator plant in which a solution such as sea water is to be processed. A plurality of interconnected paired stage units 10 are used to obtain the desired plant desalination efficiency.

Each paired stage unit 10 is provided with an elongated shell 15 which defines individual flash evaporation chambers 11 and 13 extending along the full length of the shell 15 in a bottom portion thereof. The upstream evaporation chamber 11 operates at a higher temperature and pressure, whereas the other downstream chamber 13 operates at a lower temperature and pressure. The shell 15 includes an upstream side wall 12, a longitudinal interstage evaporation stage partition 44, and a downstream side wall 14 each extending the full length of the shell 15 and the evaporation chambers 11 and 13. The longitudinal partition 44 generally longitudinally divides the bottom portion of the shell 15 into the two elongated evaporation chambers 11 and 13.

A roof or top member 16, preferably peaked and sloped in this case, covers the space between the longitudinal walls 12 and 14 and end walls or plates 18 and 20 which enclose the ends of the shell 15. A flat bottom member 22 (which continues as the bottom member for the next adjacent modular evaporator unit) completes the structure to define a generally rectangular enclosure preferably having a roof top which is peaked at its midpoint and sloped along the longitudinal dimension.

If desired, the evaporator unit 10 can be manufactured as a module without the downstream wall 14. The modules can then be field assembled together at the plant site to provide successive evaporator units with only a single wall (i.e. the upstream wall 12) as opposed to a double wall between successive units.

The longitudinal walls 12, 44 and 14 terminate a distance above the bottom 22 to define a series of brine flow openings 23 which also extend the full length of the shell 15. A dam member 26 projects upwardly from the bottom 22 just downstream of the brine flow openings 23 to cause the brine to cascade thereover for increased exposure and vaporization of the brine in the associated evaporation chamber 11 or 13. A horizontal splash baffle 27 projects forwardly into the higher temperature evaporation chamber 11 from the wall 12 just above the dam member 26 and extends slightly over the dam member 26 to reduce brine droplets from being entrained in upward vapor flow.

A single condenser tube bundle 30, generally circular in cross-section in this embodiment, extends along the full length of the shell 15 in the upper space beneath the roof member 16. A transverse interstage partition or dividing wall 32 is disposed preferably midway between the two opposed shell end plates 18 and 20 to aid in transversely dividing the upper portion of the housing 15 into two separate condenser chambers 34, 36. Each tube in the bundle 30 passes through an opening in the dividing wall 32 in sealed engagement therewith.

The condenser chamber 34 receives the vaporized solvent or vapor from the upstream evaporation chamber 11, and it is therefore partitioned from the downstream evaporation chamber 13 by a shroud member 35 which extends along the tube bundle between the condenser interstage partition 32 and the associated end plate 18 and generally covers one side of the tube bundle between the roof 16 and a distillate collection tray 38 which encloses the bottom of the condenser chamber 34. Similarly, a shroud 37 partitions the condenser chamber 36 from the upstream evaporation chamber 11.

In summary, the condenser chambers 34 and 36 are sealed and divided by the transverse partition 32 and the tray 38 and shrouds 35 and 37 into two separate condenser stages. Each condenser chamber has a vapor flow entry from the associated evaporation chamber therebelow.

Opposite ends of the condenser tubes are received in tubesheets which are secured to the external face of the opposed end plates 18 and 20 and have attached thereto a hot water box (not shown) adjacent the end plate 18 and a cold water box (not shown) adjacent the end plate 20 to supply coolant to the condenser tubes in a manner well known in the art.

The distillate collection tray 38 is elongated and generally U-shaped to collect distillate from the condenser tubes. The tray 38 is disposed beneath the condenser tube bundle 30 and has separate portions 38a and 38b extending generally from the end shell plates 18 and 20 respectively to the dividing wall 32. The tray portions 38a and 38b are stage separated from each other by a bottom portion of the dividing wall 32. Upwardly projecting side legs 39a and 39b, of the tray 38 respectively are transversely spaced from the elongated shell side walls 12 and 14. In the evaporation chamber 13, the bottom 29 of the collection tray 38 functions to some extent as a splash baffle like the baffle 27 does in the chamber 11.

Distillate collected in the tray portions 38a and 38b falls into a common collection duct 50 which preferably extends across the midline of the evaporator units and accumulates distillate received from the successive units. More detail is presented on the collection duct in a copending application entitled "Paired Stage Flash Evaporator Unit Having Improved Distillate Collection", filed by D. Cane and R. Peterson concurrently herewith and assigned to the same assignee.

A horizontally disposed and elongated mesh separator 40 preferably extends over the entire length of the evaporation chamber 11 and is supported thereover by suitable bracket (not shown) or other means on the upstream wall 12 and the tray leg 39a. The mesh separator 40 permits vapor to flow therethrough from the evaporation chamber 11 to the condenser chamber 34 substantially free of any entrained brine droplets. A similar mesh separator 41 is supported by the wall 14 and the tray leg 39b over the full length of the evaporation chamber 13 to direct vapor therefrom to the condenser chamber 36.

Generally, the mesh material is a corrosion resistant material such as stainless steel. A mesh support frame may be formed from $\frac{1}{4}''$ rods welded in a box shape with the length and width needed for the particular evaporator unit with which it is to be used. The mesh frame height may typically be 4 to 6 inches. The mesh assembly is completed by fastening the mesh support frame to the supporting brackets, pipes or other means by wire, U-bolts or other means.

To enable vapor to flow continuously from evaporation chamber to associated condenser chamber, it is necessary to collect and concentrate non-condensable gases for venting from the condenser chamber to the next condenser stage or other lower pressure region. For this purpose, vapor which enters the condenser chamber is first directed transversely across a major portion of the condenser tubes where a major fraction of the total condensation occurs. The vapor is then directed to an enveloped tube bundle portion which is coextensive with the condenser chamber and where cool isolated tubes cause condensation of most of the remaining water vapor prior to venting some remanent water vapor and non-condensables from the condenser stage. As a result, improved operating efficiency and overall performance is achieved.

More particularly, in the embodiment shown in FIGS. 1-5, the tube bundle 30 is generally circular in cross-section and a baffle arrangement in each condenser chamber includes a vertical baffle plate 52 and a horizontal baffle plate 54 that extend substantially along the full length of the tube bundle 30 in the chamber. The baffle plates 52 and 54 are engaged with a wall portion of the shroud along the tube bundle length generally to envelope a triangular section 51 of the tube bundle 30 within the chamber.

In the upstream (HT) condenser chamber 34, vapor flows into the enveloped tube section 51 through an elongated opening between the inner edges 53, 55 of the baffle plates 52 and 54 along the tube bundle length. In this case, the vapor then flows along the length of the enveloped tube section 51, and condenses on the cool tubes thereby reducing to a minimum the quantity of water vapor associated with the non-condensable gases in the flow near the transverse interstage partition 32. Typically, about 0.1% of the total vapor flow in each stage may be noncondensable gases and 1.5% or less of the vapor generated by the evaporator in that stage would be lost in vent flow through a vent opening 58 in the shroud to the connecting space between the evaporation and condenser chambers in the next stage. The vent 58 is easily accessible for inspection and maintenance as required.

Non-condensable gases are similarly collected and directed along an enveloped tube section 51a in the downstream (LT) condenser chamber 36. However, at the downstream end of the condenser 36, non-condensable gases are vented through a conduit 60 to the next or another lower pressure evaporator unit or to a non-condensable gas removal system (not shown).

In summary of the general operation of the evaporator unit, brine enters the first upstream or higher temperature (HT) flash evaporator stage through a series of flow openings 23 which extend over the entire length of the shell (i.e. perpendicular to the direction of brine flow). The vapor which is flashed-off within the HT chamber flows through the upwardly located mesh 40 where entrained brine droplets are removed before the vapor enters the condenser chamber 34. Vapor is condensed on the heat transfer surface of the condenser tubes to form distillate which is collected in the distillate tray 38. Non-condensable gases are vented to the next evaporation stage through the vent opening 58.

The described operating process is essentially duplicated in the second lower temperature (LT) stage with the vapor flowing through the mesh separator 41 associated with the LT stage and enters the chamber 36 in which the other portion of the two stage condenser tube bundle is located. Any non-condensable vapors in the condenser chamber 36 are vented into the enveloped tube bundle portion and that portion of the vapor not condensed therein is ultimately externally vented through the conduit 60.

In the specific operation of the disclosed paired stage evaporator structure, improved user efficiency and overall performance and improved economy result from the described mesh and related structure. The mesh separator provides the total flow cross-section needed, in cooperation with related structure to direct vapor from each evaporator chamber to its associated condenser chamber while separating entrained liquid which drops back to the evaporator chamber.

Prior art paired stage units typically employ a mesh separator which is coextensive with the associated condenser chamber with a blanking plate placed over the evaporator chamber coextensively with the other condenser chamber. As a result, vapor generated in the evaporator chamber under the other condenser chamber must flow under pressure differential longitudinally under the blanking plate and along the unit for passage through the mesh to the associated or paired condenser chamber. Further, inasmuch as there is a minimum required mesh area for a particular paired stage capacity, the width of the mesh (parallel to the direction of brine flow) has been relatively large as a result of limited mesh length. Since the width of the evaporator shell (in the direction of brine flow) is directly affected by the mesh width, the use of a half-length mesh has resulted in an enlarged shell width and a considerable amount of unused shell volume in the space above the blanking plate.

Since the structure disclosed herein employs a mesh extending the full length of the unit coextensively with both condenser stages, a significant reduction in mesh width (factor of two relative to the described typical prior art) which in turn reduces significantly the volume, weight and cost of the evaporator shell.

Further, user efficiency and overall performance are improved because of the improved vapor flow conditions produced by the described structure.

Vapor which rises from the evaporation chamber 11 through the mesh separator 40 along the length of the condenser chamber 34 generally flows directly into the chamber 34. Vapor which rises from the evaporation chamber 11 through the mesh separator 40 along the length of the other condenser chamber 36 is directed by a roof portion 62, the condenser bundle shroud 37 and the upstream sidewall 12 generally longitudinally through the enveloped space above the mesh until it merges with directly rising vapor flow for entry into the chamber 34. Similar operation occurs in the downstream chambers 13 and 36.

A significant portion of the vapor generated in the evaporation chamber 11 (or the chamber 13) is thus required to travel longitudinally (parallel to the condenser tube axis) in the enveloped space above the mesh separator 40. The flow of vapor through this path results in an additional pressure drop which affects the amount of heat transfer surface required in the condenser and, if excessive, can cause maldistribution of vapor flow through the mesh separator 40.

Figure 5:
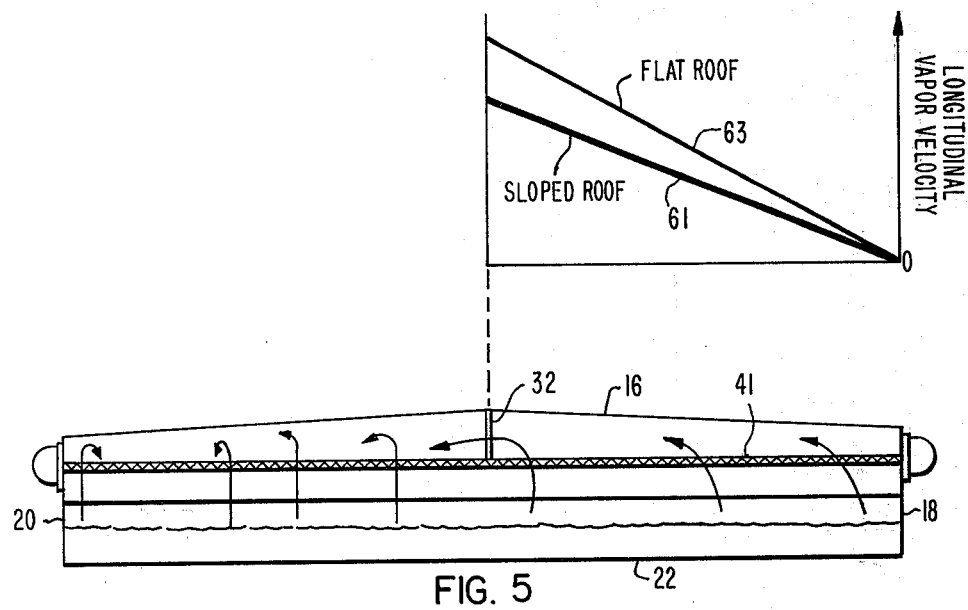
FIG. 5 shows a schematic diagram illustrating the relationship of longitudinal vapor velocity and roof sloping.
Figure 4:
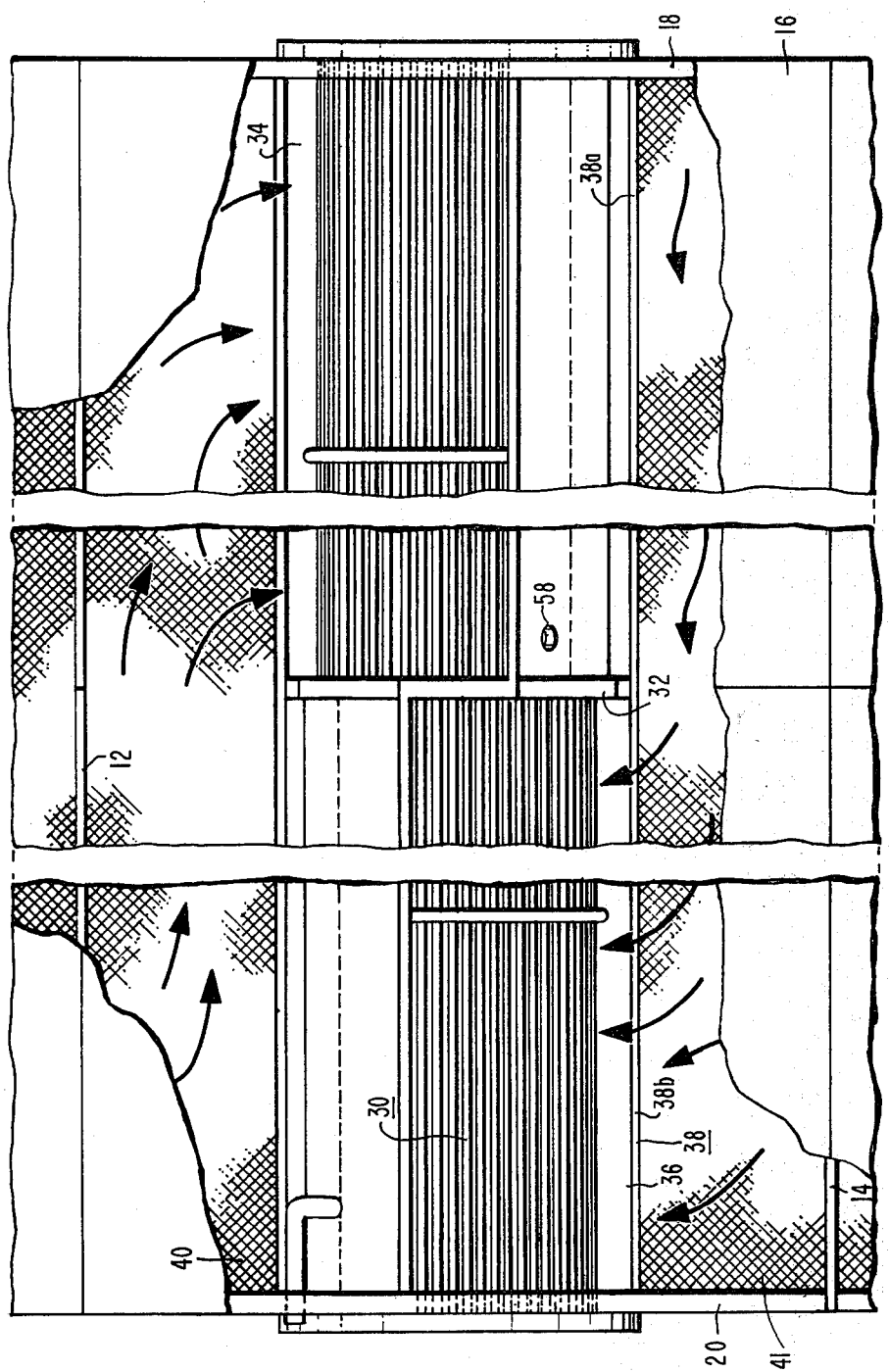
FIG. 4 shows a plan view which is partially broken away to show the condenser tube bundle and the manner in which vapor flows through and over a liquid separator mesh to enter the condenser chamber in each stage.

The effect of this pressure drop on heat transfer surface and vapor flow distribution through the mesh separator 40 is materially reduced by proper structuring of the longitudinal vapor flow path. Thus, the roof 16 of the evaporator vessel is preferably sloped as shown in FIG. 5 to provide an increasing flow area in the direction of vapor flow with the greatest flow area at the point of maximum longitudinal vapor flow.

The degree of sloping of the roof 16 is set as necessary to limit the longitudinal vapor flow pressure drop (or velocity increase) to an acceptable value in accordance with heat transfer surface and vapor flow distribution through the wire mesh. FIG. 5 shows the improvement achieved by a sloped roof at 61 as compared to a flat roof at 63.

Sloping of the roof 16 also provides for drainage of rain or other water from the outside top surface of the evaporator vessel. This is an important secondary benefit in view of commercial experience with deterioration of heat insulation and corrosion of carbon steel roof material due to absorption of leakage moisture by the insulation.

In some cases, longitudinal pressure drop over the vapor flow path may be sufficiently low that the longitudinal flow path need not be increased in cross-section by roof sloping or other means. Generally, more need occurs for roof sloping as the mesh length is increased and its width is decreased. Similarly, increasing unit size (and tube length) creates greater need for roof sloping.

Figure 2:
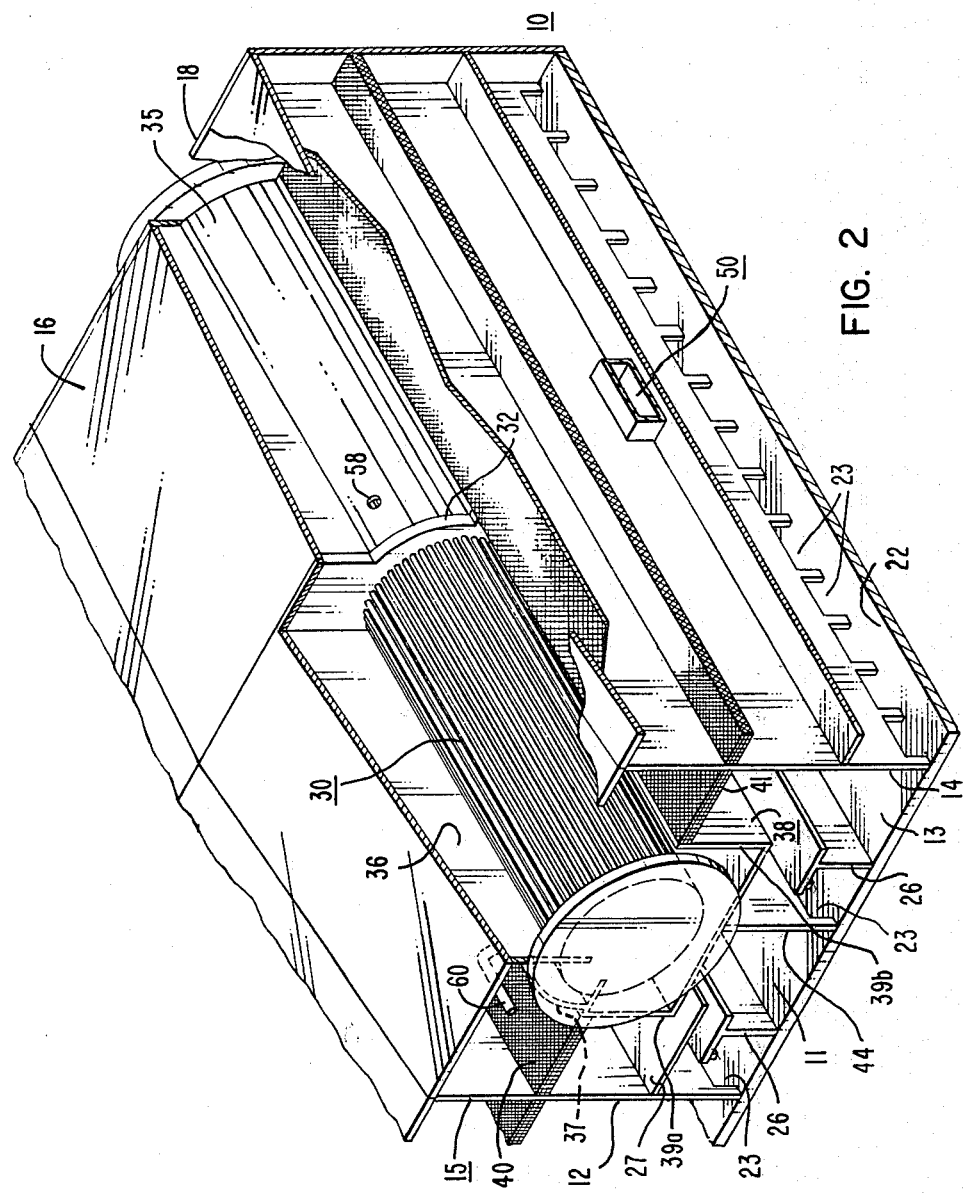
Figure 3:
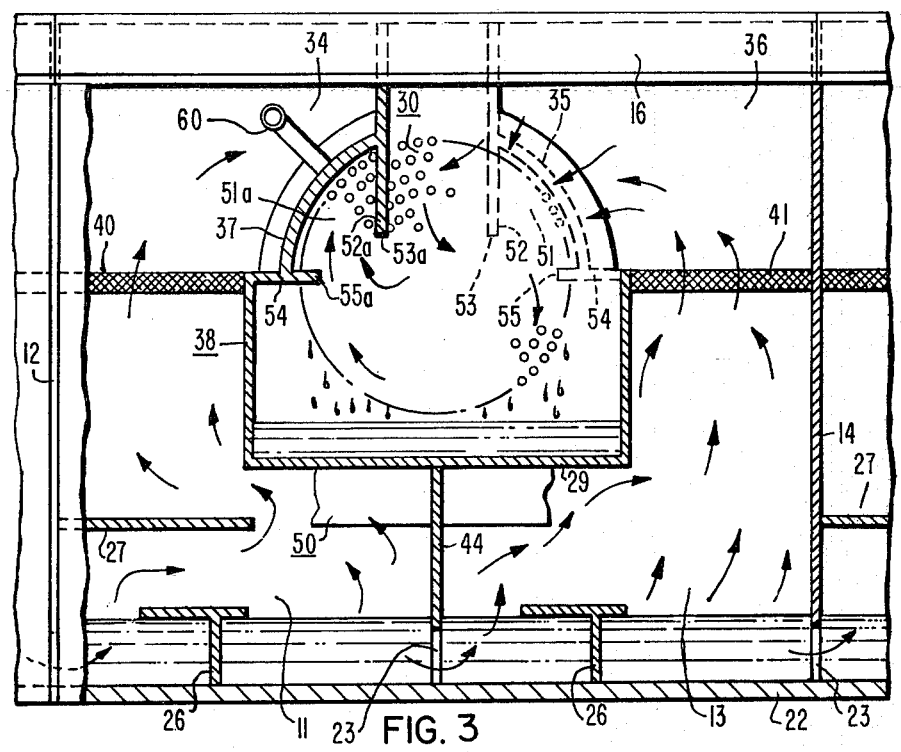
FIG. 3 shows a cross-section of the unit to illustrate the manner in which vapor flows from the flash chamber to the associated condenser chamber in the lower temperature stage of the two stages in the unit.
Figure 7:
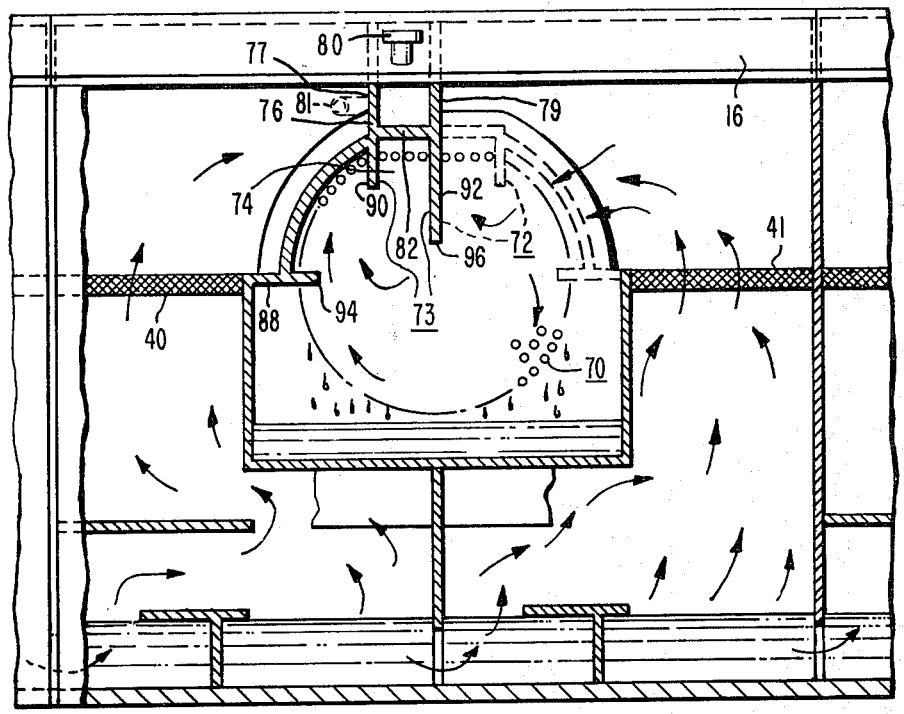
FIGS. 7 and 8 show alternate embodiments of the invention in which different tube bundles are employed.
Figure 8:
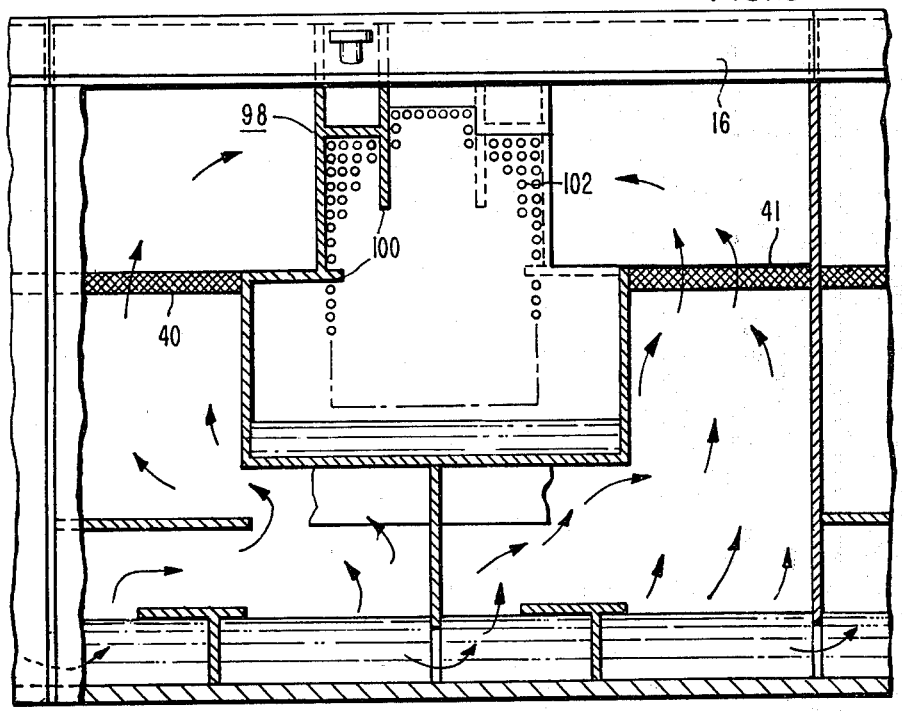

In FIGS. 6-8, additional embodiments of the invention are shown with like reference characters employed for parts like those parts employed in the FIG. 2 embodiment. FIGS. 6 and 7 show a tube bundle arrangement 70 which is generally preferred and which has a generally circular cross-section. It includes a baffle and vent arrangement 72 (HT stage) or 73 (LT stage) which efficiently converges transverse vapor flow within an enveloped tube section 74 provided in each stage. In the LT stage, non-condensables from the converged vapor flow are directed into a vent duct 76 which extends along the tube bundle length. The vent duct 76 directs the noncondensables from the condenser chamber 36 to a vent conduit 80 extending through the roof 16 or alternatively to a vent conduit 81 (shown dotted) extending through the end plate 20. The duct 76 additionally functions as a partition between the HT and LT stages in the upper space between the transverse interstage partition 32a and the end plate which corresponds to the end plate 20 of the embodiment shown in FIG. 4. In the lower deck of multideck units, the vent conduit is extended through the end plate, and, in single deck units, it is preferably extended through the roof 16.

A top wall for the vent duct 76 is preferably formed by the sloped roof plate 16. Elongated plates form the duct side walls 77 and 79. An elongated plate 82 preferably is included to form a bottom wall of the vent duct 76 in the LT stage and it preferably includes a plurality of openings 84 along its length for passage of non-condensables from the enveloped tube section 74 in the chamber 36 into the vent duct 76. In one alternative, the bottom plate 82 can be omitted, with the non-condensables collected along the full length of the duct 76 and extracted through vent conduit 80 or 81. In the HT stage, a duct like the duct 76 is not needed. Instead, multiple longitudinally spaced vent openings 84 are preferably provided in the HT stage shroud 35a to vent the condenser chamber 34 to the LT stage. If a duct (not shown) is provided in the HT stage, non-condensables collected along its length can be directed to the end of the duct for venting through an opening (not shown) in the duct end wall (a portion, not shown, of the interstage partition 32a) to the LT stage.

The baffle portion of the baffle and vent arrangement 72 in the LT stage and the arrangement 73 in the HT stage each includes a horizontal stub baffle 88 which prevents vapor from bypassing the tube bundle by flowing to the vent duct 76 in the LT stage or the shroud vent openings in the HT stage in the annular space between the outer tubes and the tube bundle shroud.

To converge the transverse vapor flow in the tube bundle for outflow of non-condensables into the vent duct 76, the baffle arrangement 72 further includes a pair of spaced vertical baffle plates 90 and 92 which are coextensive with the tube bundle 70 and contain the enveloped tube section 74 which lies directly beneath the shroud vent openings in the HT stage and beneath the vent duct 76 in the LT stage.

In both stages, a single elongated plate 85 preferably extends downwardly from the roof 16 into the tube bundle to form the vertical baffle plate 92. In the HT stage, the portion of the plate 85 between the roof 16 and the tube bundle partitions the two stages from each other in the upper space along the condenser chamber 34. In the LT stage, the portion of the plate 85 between the roof 16 and the tube bundle is the side wall 79 of the vent duct 76.

Vapor which flows transversely between the inner edges 94 and 96 of the stub baffle plate 88 and the vertical baffle plate 92 converges to the enveloped tube section 74 where the last condensing action takes place prior to venting through the vent duct 76 in the LT stage or the shroud openings in the HT stage.

In FIG. 8, a similar non-condensable vent duct 98 and baffle arrangement 100 are shown in another embodiment of the invention. Operating features and advantages, like those described for the FIG. 7 embodiment, apply to this embodiment. In this case, a tube bundle 102 has a generally rectangular cross-section. The embodiment of FIG. 8 is preferred where the particular product size and other design characteristics result in the rectangular cross-section bundle having relatively lower manufacturing costs and more economic plant operation due to reduced plant investment.

What is claimed is:

1. A multistage flash evaporator unit for a multistage flash evaporation plant wherein successive evaporation stages are operated at successively decreasing pressures to evaporate a solvent from a solution, said evaporator unit comprising:
   a generally elongated enclosure having opposed end walls and elongated side and top and bottom walls extending therebetween;
   said enclosure having a lower portion where the solvent is evaporated and an upper portion where the distillate is condensed;
   means for dividing said upper enclosure portion into a pair of separate condenser chambers staged in the longitudinal direction;
   condenser means including an array of elongated heat exchanger tubes extending between said end walls to provide tube coolant flow in the longitudinal direction, said tubes extending through apertures in said dividing means;
   means for collecting distillate for outflow from the condenser chambers;
   means for partitioning said enclosure lower portion to define a pair of separate longitudinally extending evaporation chambers through which the solution is successively directed in the cross-enclosure direction;
   means for separating said condenser chambers from said evaporation chambers and for directing flow of evaporated solvent from one of said evaporation chambers to one of said condenser chambers in one higher temperature evaporation stage and from the other evaporation chamber to the other condenser chamber in the next lower temperature evaporation stage;
   means for supporting liquid separating means in the vaporized solvent path above each evaporation chamber;
   each of said liquid separating means being substantially coextensive with its associated evaporation chamber and both of said condenser chambers to direct the solvent into space thereabove in said upper enclosure portion where a major portion thereof flows generally directly in the transverse direction into the associated condenser chamber and the rest first flows generally in the longitudinal direction and then generally transversely into the associated condenser chamber; and
   means for directing vapor in a path through said condenser tubes and for venting noncondensables from each condenser stage to a lower pressure location.

2. A flash evaporator unit as set forth in claim 1 wherein boundary means are provided about the longitudinal flow portion of the space over each of said liquid separator means, said boundary means defining a path cross-section for the longitudinal flow which increases in size with decreasing distances from the associated condenser chamber.

3. A flash evaporator unit as set forth in claim 2 wherein said top wall is a roof sloped in the enclosure longitudinal direction and each of said boundary means includes a portion of said roof as a portion thereof so that the roof slope provides said increasing cross-section.

4. A flash evaporator unit as set forth in claim 3 wherein said roof is peaked substantially over said condenser chamber dividing means and slopes downwardly from the peak in opposite directions to said end walls.

5. A flash evaporator unit as set forth in claim 2 wherein said liquid separator means is a mesh.

6. A multistage flash evaporator unit for a multistage flash evaporation plant wherein successive evaporation stages are operated at successively decreasing pressures to evaporate a solvent from a solution, said evaporator unit comprising:
   a generally elongated enclosure having opposed end walls and elongated side and top and bottom walls extending therebetween;
   said enclosure having a lower portion where the solvent is evaporated and an upper portion where the distillate is condensed;
   means for dividing said upper enclosure portion into a pair of separate condenser chambers staged in the longitudinal direction;
   condenser means including an array of elongated heat exchanger tubes extending between said end walls to provide tube coolant flow in the longitudinal direction, said tubes extending through apertures in said dividing means;
   means for collecting distillate for outflow from the condenser chambers;
   means for partitioning said enclosure lower portion to define a pair of separate longitudinally extending evaporation chambers through which the solution is successively directed in the cross-enclosure direction;
   means for separating said condenser chambers from said evaporation chambers and for directing flow of evaporated solvent from one of said evaporation chambers to one of said condenser chambers in one higher temperature evaporation stage and from the other evaporation chamber to the other condenser chamber in the next lower temperature evaporation stage;
   means for supporting liquid separating means in the vaporized solvent path above each evaporation chamber;
   means for directing vapor in a path through said condenser tubes and for venting noncondensables from each condenser stage to a lower pressure location;
   said vapor directing means including means for enveloping a section of the tubes in each condenser chamber along substantially their full length with provision for vapor entry into the enveloped tube section substantially along the full length thereof; and means for removing noncondensables from the enveloped tube section in each condenser chamber.

7. A flash evaporator unit as set forth in claim 6 wherein said enveloping means includes a pair of baffle plates extending substantially the full length of each condenser chamber between the end wall and said dividing means and having an elongated spacing for vapor entry between inwardly located edges thereof.

8. A flash evaporator unit as set forth in claim 7 wherein one baffle plate in each condenser chamber is generally horizontal and the other baffle plate is generally vertical, said vertical baffle plate extends upwardly from said tube bundle and engages said top wall along one edge thereof, and shroud means for partially enclosing each condenser chamber and cooperating with said baffle plates to define said enveloped tube section and partition said evaporation stages from each other.

9. A flash evaporator unit as set forth in claim 8 wherein said removing means includes at least one vent opening through said shroud means for the higher pressure condenser chamber to provide for flow of noncondensables into the vapor flow into the lower pressure condenser chamber.

10. A flash evaporator unit as set forth in claim 7 wherein both baffle plates in each condenser chamber are generally vertical and spaced from each other.

11. A flash evaporator unit as set forth in claim 10 wherein at least one of said baffle plates in each evaporation stage extends upwardly from said tube bundle and engages said top wall along one edge thereof, and shroud means for partially enclosing each condenser chamber and cooperating with said baffle plates to define said enveloped tube section and partition said evaporation stages from each other.

12. A flash evaporator unit as set forth in claim 10 wherein plate means are provided for blocking bypass flow about the periphery of the tube bundle to the enveloped tube section.

13. A flash evaporator unit as set forth in claim 11 wherein duct means substantially coextensive with the enveloped tube section in at least one of said condenser chambers receive the non-condensable gases, and means for directing the non-condensables from said duct means to the lower pressure location.

14. A flash evaporator unit as set forth in claim 13 wherein said duct means includes a bottom plate having at least one opening therethrough to the enveloped tube section, and at least one non-condensable outflow passage is provided from said duct means.

15. A flash evaporator unit as set forth in claim 14 wherein multiple longitudinally spaced inlet openings are provided in said duct bottom plate and one or more longitudinally spaced outflow passages are provided from said duct means.

16. A flash evaporator unit as set forth in claim 14 wherein said duct means extends through space above the tube bundle and below said enclosure top wall, and wherein the top of said duct means is formed by said enclosure top wall and said duct means has spaced side walls connected between said top wall and said bottom plate, one of said duct side walls being formed by a portion of one of said baffle plates which extends upwardly from said tube bundle and engages said top wall along one edge thereof.

17. A flash evaporator unit as set forth in claim 16 wherein said duct means is provided in said low temperature stage and wherein said shroud means in said high temperature stage includes opening for venting said condenser chamber in said higher temperature evaporation stage to said lower temperature evaporation stage.

18. A flash evaporator unit as set forth in claim 10 wherein said tube bundle has a generally rectangular or square cross-section.

19. A flash evaporator unit as set forth in claim 11 wherein said tube bundle has a generally circular cross-section.

* * * * *